United States Patent
Yeo

(10) Patent No.: US 12,362,920 B2
(45) Date of Patent: Jul. 15, 2025

(54) THRESHOLD SECRET SHARING WITH HIDDEN ACCESS STRUCTURES

(71) Applicant: Seagate Technology LLC, Fremont, CA (US)

(72) Inventor: Foo Yee Yeo, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 559 days.

(21) Appl. No.: 17/748,900

(22) Filed: May 19, 2022

(65) Prior Publication Data

US 2023/0379144 A1 Nov. 23, 2023

(51) Int. Cl.
*H04L 9/08* (2006.01)

(52) U.S. Cl.
CPC .................... *H04L 9/085* (2013.01)

(58) Field of Classification Search
CPC ........................................ H04L 9/085
See application file for complete search history.

(56) References Cited

U.S. PATENT DOCUMENTS

| | | | |
|---|---|---|---|
| 8,059,816 | B2 | 11/2011 | Bai |
| 9,813,243 | B1 | 11/2017 | Triandopoulos et al. |
| 9,929,860 | B1 | 3/2018 | Triandopoulos et al. |
| 10,084,596 | B1 | 9/2018 | Triandopoulos et al. |
| 11,115,196 | B1 * | 9/2021 | Triandopoulos ...... H04L 63/083 |
| 2009/0136024 | A1 * | 5/2009 | Schneider ............... H04L 9/085 380/28 |
| 2010/0217986 | A1 * | 8/2010 | Schneider ............. H04L 9/3242 380/279 |
| 2011/0126291 | A1 * | 5/2011 | Araki ..................... H04L 9/085 726/26 |
| 2022/0085978 | A1 | 3/2022 | Sehrawat et al. |
| 2022/0085979 | A1 | 3/2022 | Sehrawat et al. |

OTHER PUBLICATIONS

Blakley, G. R., "Safeguarding cryptographic keys", American Federation of Information Processing, 1979, 313-317.

(Continued)

*Primary Examiner* — Ayoub Alata
(74) *Attorney, Agent, or Firm* — HOLZER PATEL DRENNAN

(57) ABSTRACT

Cryptographic sharing of a cryptographic secret among multiple parties provides a share of the cryptographic secret is generated for each party. Multiple threshold access structure tokens are generated for each party of the multiple parties. The threshold access structure tokens are generated for a party from one or more random token polynomials selected from a finite field based on the numbers of the multiple parties capable of attempting to reconstruct the cryptographic secret. The share of the cryptographic secret and the multiple threshold access structure tokens generated for each party are distributed to the corresponding party. At least a threshold number of the parties can reconstruct the cryptographic secret using the shares of the cryptographic secret and threshold access structure tokens corresponding to at least a threshold number of the parties attempting to reconstruct the cryptographic secret while less than the threshold number of parties cannot reconstruct the cryptographic secret.

20 Claims, 6 Drawing Sheets

(56) References Cited

OTHER PUBLICATIONS

Ito, Mitsuru, et al., "Secret Sharing Scheme Realizing General Access Structure", Globecom 1987, 99-102.
Sehrawat, Vipin Singh, et al., "Access Structure Hiding Secret Sharing from Novel Set Systems and Vector Families", Cocoon, 2020, 246-261.
Sehrawat, Vipin Sehrawat, et al., "Extremal set theory and LWE Based Access Structure Hiding Verifiable Secret Sharing with Malicious-Majority and Free Verification", Theoretical Computer Science, 2021, 106-138.
Shamir, Adi, "How to share a secret", Communications of the ACM, vol. 22, Issue 11, Nov. 1979, 612-613.

* cited by examiner

200

Generate a share of the cryptographic secret for each party of the multiple parties
202

Generate multiple threshold access structure tokens for each party of the multiple parties
204

Distribute the share of the cryptographic secret and the multiple threshold access structure tokens generated for each party to the corresponding party
206

THRESHOLD SECRET SHARING WITH HIDDEN ACCESS STRUCTURES

SUMMARY

The described technology provides cryptographic sharing of a cryptographic secret among multiple parties. A share of the cryptographic secret is generated for each party of the multiple parties. Multiple threshold access structure tokens are generated for each party of the multiple parties, the threshold access structure tokens being generated for a party from one or more random token polynomials selected from a finite field based on numbers of the multiple parties capable of attempting to reconstruct the cryptographic secret. The share of the cryptographic secret and the multiple threshold access structure tokens generated for each party are distributed to the corresponding party, wherein at least a threshold number of the parties can reconstruct the cryptographic secret using the shares of the cryptographic secret and threshold access structure tokens corresponding to at least a threshold number of the parties attempting to reconstruct the cryptographic secret and less than the threshold number of the parties cannot reconstruct the cryptographic secret using the shares of the cryptographic secret and the threshold access structure tokens corresponding to the less than the threshold number of the parties.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Generally, secret sharing refers to cryptographic methods for taking a secret (e.g., a cryptographic key), breaking it up into multiple shares, and distributing the shares among multiple parties, so that only when the parties bring together their respective shares can the secret be reconstructed. More specifically, with threshold secret sharing, the holder of a secret, sometimes referred to as the dealer, creates n shares of a secret and defines a threshold t for the number of shares that are required to reconstruct the secret. The dealer then proceeds to distribute the n shares, so they are controlled by n different parties, and at least t of those parties are required to reconstruct the secret. Threshold secret sharing may be used, for example, to ensure that a required number of authorized parties agree to complete a large money transfer, launch nuclear missiles, or access a top-secret database.

In secure secret sharing schemes, an attacker that gains access to fewer shares of the secret than defined by the threshold t cannot gain information about the secret. Accordingly, a secret sharing scheme allows a dealer to share a secret so that strictly an authorized subset of parties, specified by an access structure, can reconstruct the secret.

In addition to the shares of the secret, the described technology enhances secure secret sharing by having the dealer also distribute threshold access structure tokens to the parties. In this manner, a subset of the n parties that is attempting to reconstruct the secret can successfully reconstruct the secret if the subset numbers at least the threshold t number of parties using their respective shares and their access structure tokens corresponding to the number of parties in the subset. In contrast, a subset of the n parties that is attempting to reconstruct the secret cannot successfully reconstruct the secret if the subset numbers less than the threshold t number of parties using their respective shares and their access structure tokens corresponding to the number of parties in the subset. Furthermore, the threshold t is hidden (e.g., not known by the n parties or other parties), being securely encoded in the threshold access structure tokens. In this manner, a dealer may share a secret among n parties in such a way that an adversary (including potentially one of the n parties) will not know the threshold number of parties that need to be compromised in order to obtain the secret.

Figure 1:
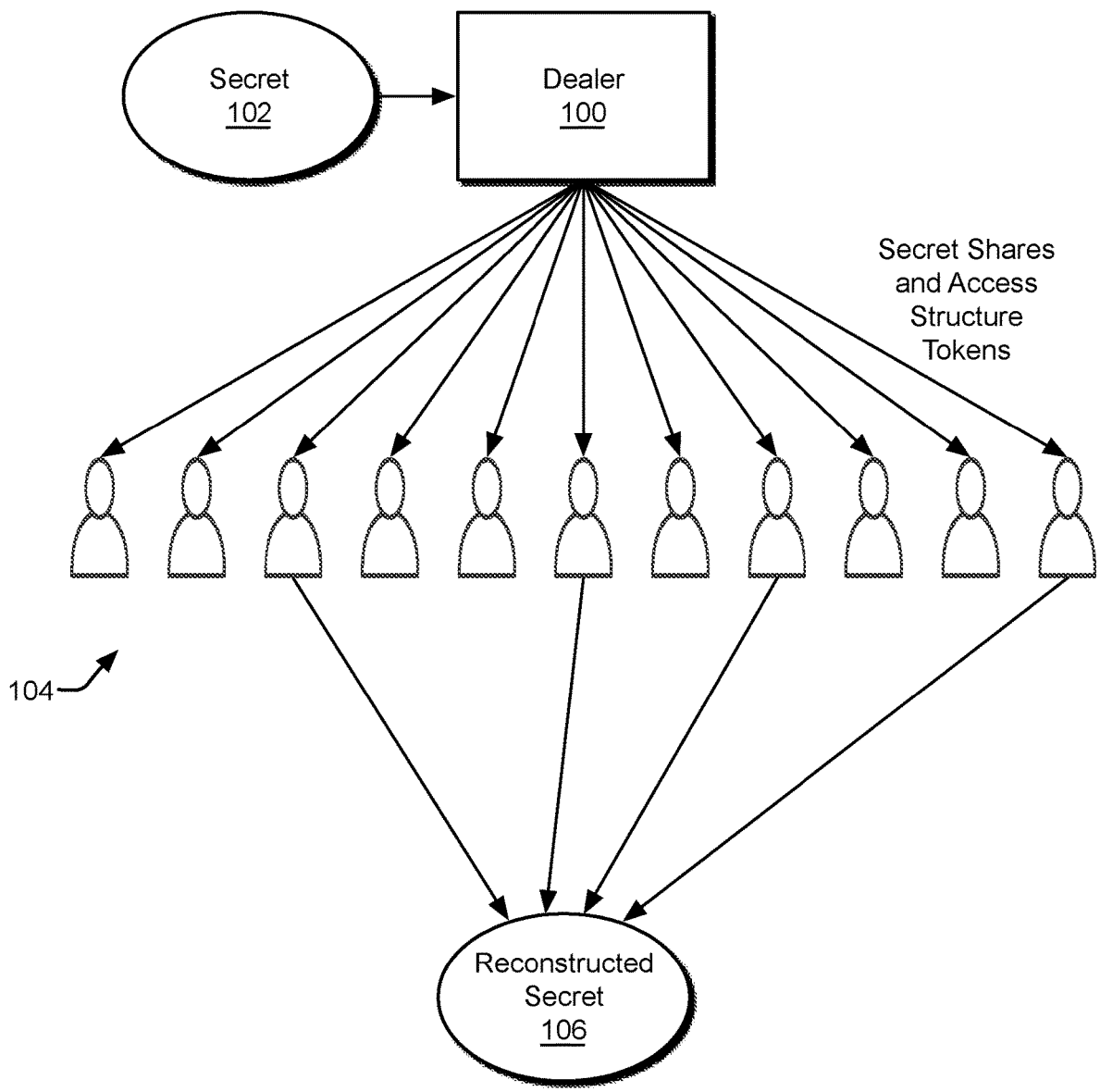
FIG. 1 illustrates example threshold secret sharing with hidden access structures.

FIG. 1 illustrates example threshold secret sharing with hidden access structures. A dealer 100 holds a secret 102, such as a cryptographic key, that the dealer 100 wishes to share amongst multiple parties 104 (e.g., n parties P). For example, the dealer 100 deconstructs the cryptographic key (secret 102) required to approve large money transfers into n shares $s_i$, for i=1, ..., n, and distributes the shares $s_i$, to n corporate officers who are authorized to approve such transactions. Further, only a subset of at least t parties is required to approve such transactions, where 1≤t≤n. As such, in FIG. 1, t=4, so only four parties are required to generate a reconstructed secret 106 (i.e., a reconstruction version of the secret 102) and thus approve the transaction.

Generally, reconstruction involves multiple parties coming together with their respective shares of the secret. In the case of threshold secret sharing, at least a threshold number of the parties are required to decrypt the secret. Parties less than the threshold are not authorized to decrypt the secret, and therefore an attempt to decrypt the secret with fewer than the threshold number of parties fails. An example secret reconstruction process involves selecting a unique polynomial s(X) of degree≤r−1 such that s(i)=$s_i$ for all i∈S and returns s(0) as the reconstructed secret x, where r the number of parties attempting to reconstruct the secret. In an example hidden access structure implementation, the threshold is not known by the parties P but is enforced by an authorization testing operation that evaluates access structure tokens associated with each party and their shares.

However, a malicious actor (or adversary, which is potentially one of the parties P) may attempt to compromise the security of the transaction by obtaining the shares of one or more other parties. In such an activity, the adversary has an advantage if he or she knows the threshold t, as it specifies the minimum number of shares that must be obtained in order to reconstruct the secret 102 as the reconstructed secret 106. When the threshold number t is known, an adversary will be able to better plan their attack by identifying t vulnerable parties of the parties P before carrying out the attack. By doing so, the parties will have less time to discover and to respond to the attack. However, when the threshold t is not known, the risk to the adversary increases. If the adversary is only able to attack four of the six parties, for example, it is riskier to carry out the attack because if the threshold is higher than four, then the attack fails and may alert the parties to the attack. On the other hand, it might take a lot more time and effort for the adversary to compromise all six parties (which would guarantee success). As such, when the threshold number is small, hiding t conceals this fact, and thus conceals that it is an "easy" target. Accordingly, hiding the threshold t from malicious actors presents security advantages.

In one implementation, a mechanism of this hiding is effected, at least in part, by generating multiple threshold access structure tokens for each party of the multiple parties and communicating the secret share and multiple threshold access structure tokens to each corresponding party. The described technology will be disclosed herein with both formal notation and proofs, as well as a narrative technical description.

As for the formal notation, the following definitions are presented.

Definition 1 (Access Structure) Let $\mathcal{P} = \{P_1, \ldots, P_n\}$ be a set of parties. A collection $\Gamma \subseteq 2^{\mathcal{P}}$ is monotone if $\mathcal{A} \in \Gamma$ and $\mathcal{A} \in \mathcal{B}$ imply that $\mathcal{B} \in \Gamma$. An access structure $\Gamma \subseteq 2^{\mathcal{P}}$ is a monotone collection of non-empty subsets of $\mathcal{P}$. Subsets in $\Gamma$ are called authorized, and subsets not in $\Gamma$ are called unauthorized.

Definition 2 (Threshold Access Structure) A threshold access structure $\Gamma$ is an access structure that contains all subsets of $\mathcal{P}$ of size$\geq$t for some fixed t, i.e.

$$\Gamma = \{\mathcal{A} \subseteq \mathcal{P} : |\mathcal{A}| \geq t\}.$$

Definition 3 (Perfect Secret Sharing Scheme with Hidden Access Structures) A perfect secret sharing scheme with hidden access structures with respect to a collection of access structures $\mathcal{A}$, a set of n parties $\mathcal{P} = \{P_1, \ldots, P_n\}$, and a set of secrets $\mathcal{K}$, consists of a pair of polynomial-time algorithms (Share,Recon), where:

Share is a randomized algorithm that gets a secret $\kappa \in \mathcal{K}$ and access structure $\Gamma \in \mathcal{A}$ as inputs, and outputs n aggregated shares, $\{\Pi_1^{(\Gamma,\kappa)}, \ldots, \Pi_n^{(\Gamma,\kappa)}\}$, of $\kappa$, Recon (referring to reconstruction) is a deterministic algorithm that gets as input the aggregated shares of a subset $\mathcal{A} \subseteq \mathcal{P}$, denoted by $\{\Pi_i^{(\Gamma,\kappa)}\}_{i \in \mathcal{A}}$, and outputs an element of $\mathcal{K} \cup \{\bot\}$, such that the following four conditions are satisfied:
1. Perfect Authorization Verification: for all secrets $\kappa \in \mathcal{K}$ and every subset $\mathcal{A} \subseteq P$, $\text{Recon}(\{\Pi_i^{(\Gamma,\kappa)}\}_{i \in \mathcal{A}}, \mathcal{A}) \neq \bot$ if $\mathcal{A} \in \Gamma$, and $\text{Recon}(\{\Pi_i^{(\Gamma,\kappa)}\}_{i \in \mathcal{A}}, \mathcal{A}) = \bot$ if $\mathcal{A} \notin \Gamma$, 2. Perfect Correctness: for all secrets $\kappa \in \mathcal{K}$ and every authorized subset $\mathcal{A} \in \Gamma$, $\text{Recon}(\{\Pi_i^{(\Gamma,\kappa)}\}_{i \in \mathcal{A}}, \mathcal{A}) = \kappa$, 3. Perfect Secrecy: for every unauthorized subset $\mathcal{B} \notin \Gamma$ and all secrets $\kappa_1, \kappa_2 \in \mathcal{K}$ the distributions $\{\Pi_i^{(\Gamma,\kappa_1)}\}_{i \in \mathcal{B}}$ and $\{\Pi_i^{(\Gamma,\kappa_2)}\}_{i \in \mathcal{B}}$ are identical, and 4. Perfect Access Structure Hiding: for every unauthorized subset $\mathcal{B} \notin \Gamma$, every access structure $\Gamma' \in \mathcal{A}$ with $\mathcal{B} \notin \Gamma'$ and all secrets $\kappa \in \mathcal{K}$, the distributions $\{\Pi_i^{(\Gamma,\kappa)}\}_{i \in \mathcal{B}}$ and $\{\Pi_i^{(\Gamma',\kappa)}\}_{i \in \mathcal{B}}$ are identical.

Given an access structure $\Gamma$ and the parties P, the dealer 100 can generate a set of access structure tokens $\{\omega_i^{(\Gamma)}\}_{i \in \mathcal{A}}$ or each party in P, such that any authorized subset of parties can use their sets of access structure tokens to identify themselves as members of the access structure $\Gamma$.

Relying on this notation and the accompanying definitions, the described technology provides a sharing function that allows the dealer 100 to allocate shares (e.g., a set of n shares, $\{\Pi_1^{(\Gamma,\kappa)}, \ldots, \Pi_n^{(\Gamma,\kappa)}\}$) of a secret 102 (e.g., a secret $\kappa \in \mathcal{K}$) to the parties 104. (e.g., a set of n parties $\mathcal{P} = \{P_1, \ldots, P_n\}$). The dealer 100 also uses an access structure $\Gamma \in \mathcal{A}$ to define the authorized subsets of parties capable of authorized reconstruction of the secret 102. Using an access structure encoding operation (e.g., based on an Access Structure Encoding Scheme or ASES), the dealer 100 can generate a set of access structure tokens $\omega_i$ for each party in P. As shown in FIG. 1, the dealer 100 then distributes the secret shares and the sets of access structure tokens to the parties P, and a subset of the parties can then generate the reconstructed secret 106. The number of parties required in this subset (e.g., threshold t) to reconstruct the secret 102, however, is encoded in the access structure tokens and is therefore inaccessible to an outside party or the parties themselves.

An example threshold secret sharing scheme with hidden access structures may be implemented based on the following concepts.

Let $\mathcal{P} = \{P_1, P_2, \ldots, P_n\}$ be the set of parties, and $\mathcal{A} = \{\Gamma_t : 1 \leq t \leq n\}$ be a collection of access structures, wherein $\Gamma_t = \{\mathcal{A} \subseteq \mathcal{P} : |A| \geq t\}$, and with $\mathcal{K} = \mathbb{F}_{\ell^\alpha}$ where $\ell$ is prime and $\mathbb{F}_{\ell^\alpha}$ is the finite field with $\ell^\alpha$ elements, and let $\mathbb{F}_{\ell^\beta} \subset \mathbb{F}_{\ell^\alpha}$ be a proper subfield with $\ell^\beta > n$, and an injection $\iota : \{1, 2, \ldots, n\} \to \mathbb{F}_{\ell^\beta} \setminus \{0\} \subset \mathbb{F}_{\ell^\alpha}$. The injection $\iota$ is used to identify elements of the set $\{1, 2, \ldots, n\}$ with elements of $\mathbb{F}_{\ell^\beta} \setminus \{0\}$.

Lemma 1 Let $1 \leq k \leq n$ and $p(X) = p_{k-1} X^{k-1} + \ldots + p_0 \in \mathbb{F}_{\ell^\alpha}[X]$ be a polynomial of degree k−1. Let $S \subset \{1, 2, \ldots, n\}$ be a subset of size k−1 and $q(X) \in \mathbb{F}_{\ell^\alpha}[X]$ be the unique polynomial of degree$\leq$k−2 such that $q(i) = p(i)$ for all $i \in S$. Then $q(0) \neq p(0)$. Furthermore, (i) if $p_{k-1} \in \mathbb{F}_{\ell^\beta}$ and $p(0) = p_0 \in \mathbb{F}_{\ell^\beta}$, then $q(0) \in \mathbb{F}_{\ell^\beta}$;

(ii) if $p_{k-1} \in \mathbb{F}_{\ell^\beta}$ and $p(0) = p_0 \notin \mathbb{F}_{\ell^\beta}$, then $q(0) \notin \mathbb{F}_{\ell^\beta}$;

(iii) if $p_{k-1} \notin \mathbb{F}_{\ell^\beta}$ and $p(0) = p_0 \in \mathbb{F}_{\ell^\beta}$, then $q(0) \notin \mathbb{F}_{\ell^\beta}$.

Proof. If $q(0) = p(0)$, then the polynomials $p(X)$ and $q(X)$ agree on the k points in the set $S \cup \{0\}$. Since both $p(X)$ and $q(X)$ have degree$\leq$k−1, then $p(X) = q(X)$. But $p(X)$ has degree k−1 by assumption, while the degree of $q(X)$ is $\leq$k−2, a contradiction.

Next, since $p(X)$ and $q(X)$ agree on the k−1 points in S and the polynomial $p(X) - q(X)$ has degree exactly k−1, $$p(X) - q(X) = p_{k-1} \prod_{i \in S}(X - i).$$

It follows that $$q(0) = p(0) - p_{k-1}\prod_{i \in \sigma}(-i).$$

In case (i), since $p(0) \in \mathbb{F}_{\ell^\beta}$ and $p_{k-1} \in \mathbb{F}_{\ell^\beta} p_{k-1} \prod_{i \in S}(-i) \in \mathbb{F}_{\ell^\beta}$, their difference $q(0) \in \mathbb{F}_{\ell^\beta}$. In case (ii), since $p(0) \notin \mathbb{F}_{\ell^\beta}$ and $p_{k-1} \in \mathbb{F}_{\ell^\beta} p_{k-1} \prod_{i \in S}(-i) \in \mathbb{F}_{\ell^\beta}$, their difference $q(0) \notin \mathbb{F}_{\ell^\beta}$. Case (iii) is similar since $p_{k-1} \notin \mathbb{F}_{\ell^\beta} p_{k-1} \prod_{i \in S}(-i) \notin \mathbb{F}_{\ell^\beta}$.

Figure 2:
FIG. 2 illustrates example operations for secret sharing process.

FIG. 2 illustrates example operations 200 for secret sharing process. The secret sharing function is described as Share($\Gamma_t$, $\kappa$), wherein $\Gamma_t$ is a threshold access structure with a threshold of t and $\kappa$ is the secret. A share generating operation 202 generates a share of the cryptographic secret for each party $p_i$ of n parties P, where i=1, ..., n. In one implementation, the share generating operation 202 selects a random share polynomial $s(X) \in \mathbb{F}_{\ell^\alpha}[X]$ of degree $\leq t-1$ such that $s(0)=\kappa$. As such, the share generating operation 202 generates the share s(i) of the secret $\kappa$ for each party $p_i$ using a random share polynomial in the finite field $\mathbb{F}_{\ell^\alpha}$.

A token generating operation 204 generates multiple threshold access structure tokens for each party of the n parties P. In one implementation, the number of unique multiple threshold access structure tokens is compressed by generating unique threshold access structure tokens for only for odd values of j, as shown by the operations listed below, where $\mathbb{F}_{\ell^\alpha}$ is the finite field and $\mathbb{F}_{\ell^\beta}$ is a subfield the finite field:

1. For each odd integer j<t−1, pick a random token polynomial $p(X)=p_j X^j + \ldots + p_0 \in \mathbb{F}_{\ell^\alpha}[X]$ such that $p_j \in \mathbb{F}_{\ell^\beta}\setminus\{0\}$ and $p_0 \in \mathbb{F}_{\ell^\alpha}\setminus \mathbb{F}_{\ell^\beta}$. Let $$\omega_i^{\frac{j+1}{2}} = p(i)$$

for i=1, ..., n.

2. If j=t−1 is odd, pick a random token polynomial $p(X)=p_j X^j + \ldots + p_0 \in \mathbb{F}_{\ell^\alpha}[X]$ such that $p_j \in \mathbb{F}_{\ell^\alpha}\setminus \mathbb{F}_{\ell^\beta}$ and $p_0 \in \mathbb{F}_{\ell^\beta}\setminus\{0\}$. Let $$\omega_i^{\frac{j+1}{2}} = p(i)$$

for i=1, ..., n.

3. For each odd integer j≥t, pick a random token polynomial $p(X)=p_j X^j + \ldots + p_0 \in \mathbb{F}_{\ell^\alpha}[X]$ such that $p_j \in \mathbb{F}_{\ell^\beta}\setminus\{0\}$ and $p_0 \in \mathbb{F}_{\ell^\beta}$. Let $$\omega_i^{\frac{j+1}{2}} = p(i)$$

for i=1, ..., n.

Operation 1 pertains to the scenario where fewer than t parties are attempting to reconstruct the secret. In this case, the random token polynomial p(X) of degree j is selected such that $p_j \in \mathbb{F}_{\ell^\beta}\setminus\{0\}$ represents that $p_j$ is in the subfield $\mathbb{F}_{\ell^\beta}$, and $p_0 \in \mathbb{F}_{\ell^\alpha}\setminus \mathbb{F}_{\ell^\beta}$ represents that $p_0$ is in the finite field $\mathbb{F}_{\ell^\alpha}$ but not in the subfield $\mathbb{F}_{\ell^\beta}$. As such, if the number of parties coming together to reconstruct the secret is less than the threshold, then, using the access structure tokens for j (less than t) generated from operation 1 for each of the j parties, the constant $q_0$ (the constant term of the polynomial q(x) reconstructed from these access structure tokens) is not in the subfield, which indicates that the parties are not authorized (because they number less than the threshold). The random token polynomial p(X) is referred to as a token polynomial for each odd integer j<t−1.

Note that the reconstructed polynomial q(x) is equal to p(x) when the number of parties attempting the reconstruction is even, but it will be different from p(x) when the number of parties attempting the reconstruction is odd. This is because q(x) always has degree equal to the (number of parties)−1 (which can have an odd or even degree depending on the number of parties performing the reconstruction), while p(x) is always an odd degree polynomial.

Operation 3 generally pertains to the scenario where t parties or more are attempting to reconstruct the secret. In this case, the random token polynomial p(X) of degree j is selected such that $p_j \in \mathbb{F}_{\ell^\beta}\setminus\{0\}$ represents that $p_j$ is in the subfield $\mathbb{F}_{\ell^\beta}$, and $p_0 \in \mathbb{F}_{\ell^\alpha}\setminus \mathbb{F}_{\ell^\beta}$ represents that $p_0$ is in the subfield $\mathbb{F}_{\ell^\beta}$. As such, if the number of parties coming together to reconstruct the secret is more than the threshold, then, using the access structure tokens for j (greater than t) generated from operation 3 for each of the j parties, the constant $q_0$ (of the reconstructed polynomial q(x)) is in the subfield, which indicates that the parties are not authorized (because they number more than the threshold).

Operation 2 pertains to an edge scenario resulting from the compression referenced above, where the number of parties attempting to reconstruct the secret is odd, and the threshold is even (i.e., j=t−1 is an odd integer). In this case, the random token polynomial p(X) of degree j is selected such that $p_j \in \mathbb{F}_{\ell^\alpha}\setminus \mathbb{F}_{\ell^\beta}$ represents that $p_j$ is not in the subfield $\mathbb{F}_{\ell^\beta}$, and $p_0 \in \mathbb{F}_{\ell^\beta}\setminus\{0\}$ represents that $p_0$ is in the subfield $\mathbb{F}_{\ell^\beta}$. As such, if the number of parties coming together to reconstruct the secret is an odd integer that is one less than the threshold, then, using the access structure tokens for j=t−1 is an odd integer generated from operation 2 for each of the j parties, the coefficient $q_j$ is not in the subfield, which indicates that the parties are not authorized (because they number fewer than the threshold).

Other implementations of generating unique threshold access structure tokens may be employed, including the non-compressed approach of generating unique threshold access structure tokens for every j. In the uncompressed approach, for example, operation 2 above may be omitted because the edge scenario introduced by compression is absent.

Figure 4:
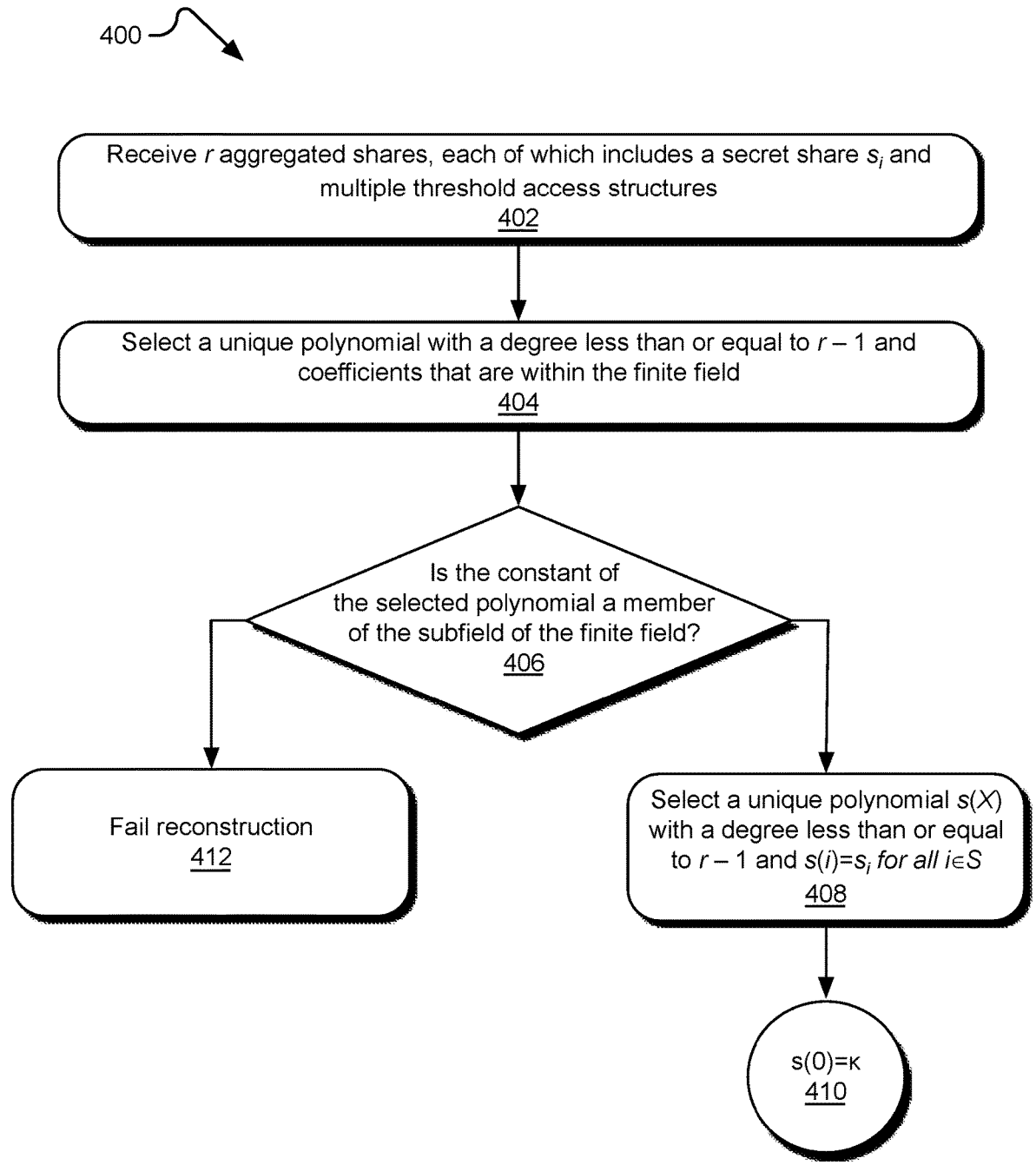
FIG. 4 illustrates example operations for secret reconstruction process.
Figure 5:
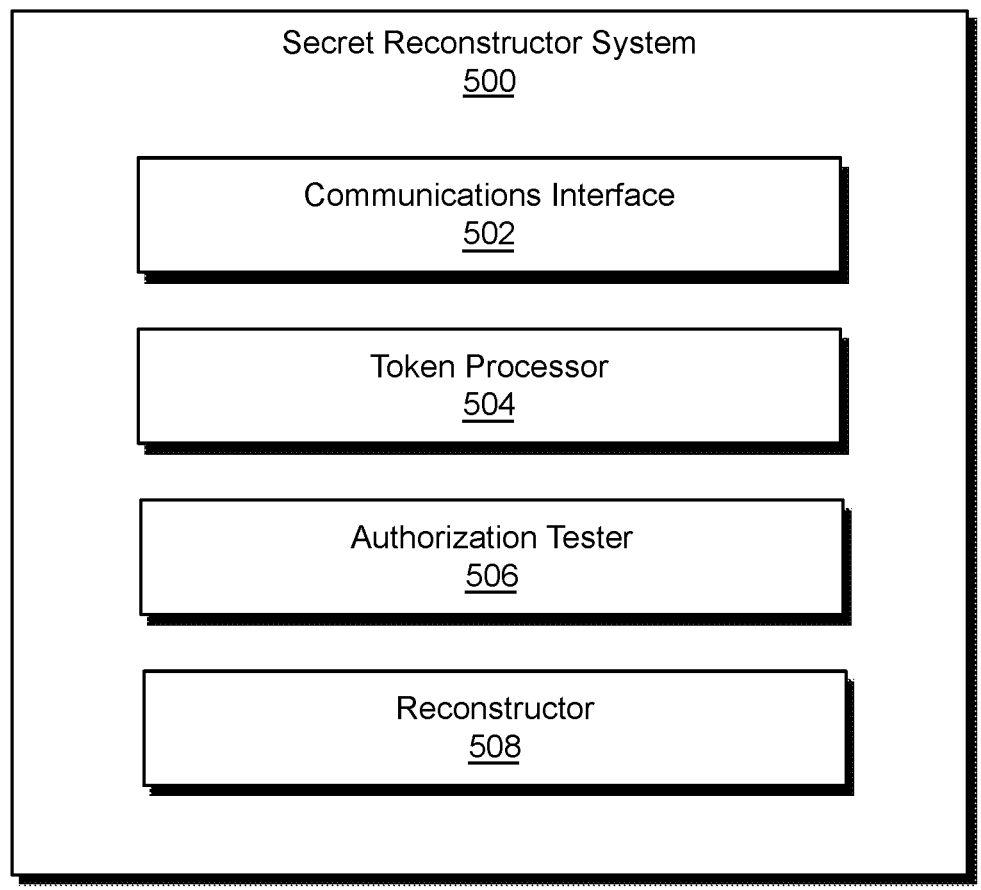
FIG. 5 illustrates an example secret reconstruction system.

A distributing operation 206 distributes aggregated shares of the cryptographic secret and corresponding threshold access structure tokens to the corresponding parties. "Aggregated share" refers to a combination of the secret share and the access structure tokens distributed to a party. As such, each party receives multiple tokens $\omega$ in association with the secret share s(i). Accordingly, for each $P_i \in \mathcal{P}$, its aggregated share is $\Pi_i = (s(i), \omega_i^1, \ldots, \omega_i^{\lceil n/2 \rceil})$, wherein the superscripts correspond to values of j. FIGS. 4 and 5 describe a method and system for reconstructing the secret.

Figure 3:
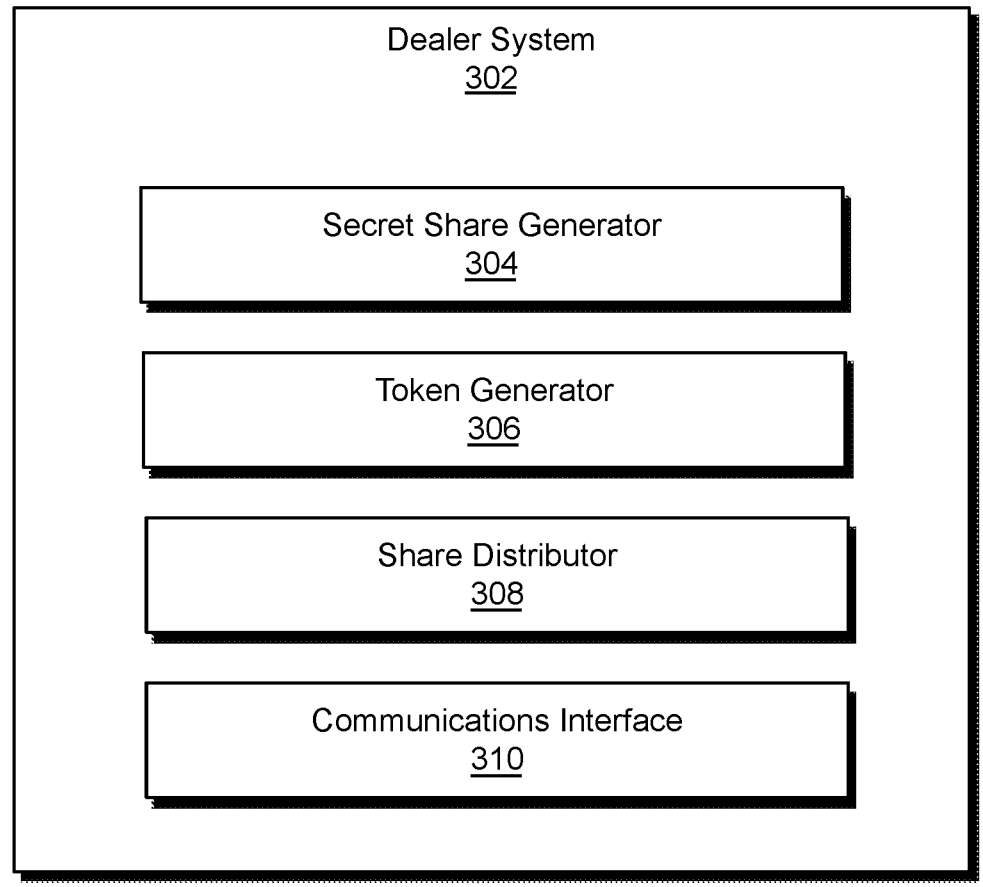
FIG. 3 illustrates an example secret sharing system.

FIG. 3 illustrates an example secret sharing system 300. The secret sharing system 300 is configured to implement a Share($\Gamma_t$, $\kappa$) function, wherein $\Gamma_t$ is a threshold access structure with a threshold of t and κ is the secret. In the illustrated implementation, secret sharing system 300 includes a dealer system 302, which receives or possesses the secret κ and the threshold t. A secret share generator 304 generates a share of the cryptographic secret for each party $p_i$ of n parties P, where i=1, . . . , n, as described with regard to the share generating operation 202 of FIG. 2.

A token generator 306 generates multiple threshold access structure tokens for each $p_i$ of the n parties P. In one implementation, the number of unique multiple threshold access structure tokens is compressed by generating unique threshold access structure tokens for only every other $p_i$, where $\mathbb{F}_{\ell^\alpha}$ is the finite field and $\mathbb{F}_{\ell^\beta}$ is a subfield of the finite field, as discussed with regard to token generating operation 204 in FIG. 2.

A share distributor 308 distributes aggregated shares of the cryptographic secret and corresponding threshold access structure tokens to the corresponding parties through a communications interface 310, such as a network interface, a data bus, etc. "Aggregated share" refers to a combination of the secret share and the access structure tokens distributed to a party. As such, each party receives multiple tokens ω in association with the secret share s(i). Accordingly, for each $P_i \in \mathcal{P}$, its aggregated share is $\Pi_g = (s(i), \omega_i^1, \ldots, \omega_i^{\lceil n/2 \rceil})$, wherein the superscripts correspond to values of j.

FIG. 4 illustrates example operations 400 for secret reconstruction process. An example secret reconstruction function is described as $\mathrm{Recon}(\{\Pi_i\}_{i \in S})$, wherein Π represents an aggregate share received from a dealer by one of the parties P and S is a subset of {1, 2, . . . , n} of size r, parse $\Pi_i$ is represented as $(s_i, \omega_i^1, \ldots, \omega_i^{\lceil n/2 \rceil})$. This notation indicates that the number of parties coming together to reconstruct the secret is r.

A receiving operation 402 receives r aggregated shares, each of which includes a secret share s(i) and multiple threshold access structures $\omega_i^1, \ldots, \omega_i^{\lceil n/2 \rceil}$. For example, one of the parties or a trusted third party can execute the role of a reconstructor entity. A token processing operation 404 selects a unique token polynomial $q(X) \in \mathbb{F}_{\ell^\alpha}[X]$ of degree≤r−1 such that $q(i) = \omega_i^{\lceil r/2 \rceil}$ for all i∈S. As such, the selected token polynomial has a degree less than or equal to r−1, and its coefficients are within the finite field $\mathbb{F}_{\ell^\alpha}$. It should be understood that the r/2 notation associated with the threshold access structure token $\omega_i^{\lceil r/2 \rceil}$ accommodates the compression aspect discussed above. In other implementations, the accommodation of compression and its odd integer condition for j and the division of r by two may be omitted.

An authorization testing operation 406 determines whether $q(0) \in \mathbb{F}_{\ell^\beta}$. If so, then the threshold number of parties needed to reconstruct the secret has been satisfied, and a reconstruction operation 408 selects a unique share polynomial $s(X) \in \mathbb{F}_{\ell^\alpha}[X]$ of degree≤r−1 such that $s(i) = s_i$ for all i∈S and returns s(0) as the reconstruct secret κ 410. Alternatively, if $q(0) \notin \mathbb{F}_{\ell^\beta}$, a denial operation 412 returns ⊥, known as an up tack or falsum, indicating that the r parties are not authorized to reconstruct the secret κ.

FIG. 5 illustrates an example secret reconstruction system 500. An example secret reconstruction system 500 is configured to implement a $\mathrm{Recon}(\{\Pi_i\}_{i \in S})$, wherein Π represent an aggregate share received from a dealer by one of the parties P and S is a subset of {1, 2, . . . , n} of size r, parse $\Pi_i$ is repressed as $(s_1, \omega_i^1, \ldots, \omega_i^{\lceil n/2 \rceil})$. This notation indicates that the number of parties coming together to reconstruct the secret is r.

A communications interface 502 receives r aggregated shares, each of which includes a secret share s(i) and multiple threshold access structures $\omega_i^1, \ldots, \omega_i^{\lceil n/2 \rceil}$, as described with regard to the receiving operation 402 of FIG. 4. A token processor 504 selects a unique token polynomial $q(X) \in \mathbb{F}_{\ell^\alpha}[X]$ of degree≤r−1 such that $q(i) = \omega_i^{\lceil r/2 \rceil}$ for all i∈S, as described with regard to the token processing operation 404 of FIG. 4.

An authorization tester 506 determines whether $q(0) \in \mathbb{F}_{\ell^\beta}$. If so, then the threshold number of parties needed to reconstruct the secret has been satisfied, and a reconstructor 508 selects a unique polynomial $s(X) \in \mathbb{F}_{\ell^\alpha}[X]$ degree≤r−1 such that $s(i) = s_i$ for all i∈S and returns s(0) as the reconstructed secret κ. Alternatively, if $q(0) \notin \mathbb{F}_{\ell^\beta}$, the reconstructor 508 returns ⊥, indicating that the r parties are not authorized to reconstruct the secret κ.

The secret reconstruction scheme described above is a perfect secret sharing scheme with hidden access structures for the collection of access structures. Theorem 2, described below, supports the validity of the secret reconstruction.

Theorem 2

$$\mathcal{A} = \{\Gamma_i : 1 \leq i \leq n\},$$

where $\Gamma_i = \{\mathcal{A} \subseteq \mathcal{P} : |A| \geq t\}$.

The following definitions and lemmas are introduced.

Definition 4 Let $S \subseteq \{1, 2, \ldots, n\}$, and $C \subseteq \mathbb{F}_{\ell^\alpha}[X]$. A sequence of elements $(\gamma_i)_{i \in S}$ that are indexed by elements of S is admissible for C if there exists some $p(X) \in C$ such that $p(i) = \gamma_i$ for all i∈S.

The following classes of polynomials are defined $$C_1^{(j)} = \{p(X) = p_j X^j + \ldots + p_0 \in \mathbb{F}_{\ell^\alpha}[X] : p_j \in \mathbb{F}_{\ell^\beta} \setminus \{0\}$$
$$\text{and } p_0 \notin \mathbb{F}_{\ell^\beta}\},$$

$$C_2^{(j)} = \{p(X) = p_j X^j + \ldots + p_0 \in \mathbb{F}_{\ell^\alpha}[X] : p_j \notin \mathbb{F}_{\ell^\beta} \text{ and }$$
$$p_0 \in \mathbb{F}_{\ell^\beta} \setminus \{0\}\},$$

$$C_3^{(j)} = \{p(X) = p_j X^j + \ldots + p_0 \in \mathbb{F}_{\ell^\alpha}[X] : p_j \in \mathbb{F}_{\ell^\beta} \setminus \{0\}$$
$$\text{and } p_0 \notin \mathbb{F}_{\ell^\beta}\}.$$

Lemma 3 Let $S \subseteq \{1, 2, \ldots, n\}$ be of size |S|=k, and let $(\gamma_i)_{i \in S}$ be any sequence of elements of $\mathbb{F}_{\ell^\alpha}$.

1. $(\gamma_i)_{i \in S}$ is admissible for $C_1^{(k)}$ if and only if it is admissible for $C_2^{(k)}$.
2. $(\gamma_i)_{i \in S}$ is admissible for $C_1^{(k')}$, $C_2^{(k')}$ and $C_3^{(k')}$ for any k<k'≤n.

Proof.

1. Suppose $(\gamma_i)_{i \in S}$ is admissible for $C_1^{(k)}$. This means there is some polynomial $p(X) = p_k X^k + \ldots + p_0 \in \mathbb{F}_{\ell^\alpha}[X]$ with $p_k \in \mathbb{F}_{\ell^\beta} \setminus \{0\}$ and $p_0 \notin \mathbb{F}_{\ell^\beta}$ such that $p(i) = \gamma_i$ for all i∈S.

Fix some $\gamma_0 \in \mathbb{F}_{\ell^\beta} \setminus \{0\}$. Then, there is some polynomial q(X) of degree≤k such that $q(i) = \gamma_i$ for all i∈S∪{0}. Now, since the polynomials p(X) and q(X) agree on all i∈S, $$q(X) - p(X) = \delta \Pi_{i \in S}(X - i)$$

for some $\delta \in \mathbb{F}_{\ell^\alpha}$. Substituting X=0 gives $$q(0) - p(0) = \delta \prod_{i \in S}(-i)\delta = \frac{q(0) - p(0)}{\prod_{i \in S}(-i)} \notin \mathbb{F}_{\ell^\beta}.$$

Therefore, as $p_k \in \mathbb{F}_{\ell^\beta}$, $q_k \notin \mathbb{F}_{\ell^\beta}$, proving that $q(X) \in C_2^{(k)}$.

To prove the converse, suppose $(\gamma_i)_{i \in S}$ is admissible for $C_2^{(k)}$, so there exists some polynomial $q(X) = q_k X^k + \ldots + q_0 \in \mathbb{F}_{\ell^\alpha}[X]$ with $q_k \notin \mathbb{F}_{\ell^\beta}$ and $q_0 \in \mathbb{F}_{\ell^\beta} \setminus \{0\}$ such that $q(i) = \gamma_i$ for all i∈S.

Fix some $p_k \in \mathbb{F}_{\ell^\beta} \setminus \{0\}$. Then, there is some polynomial $p(X)$ such that the coefficient of $X^k$ in $p(X)$ equals $p_k$ and such that $p(i)=\gamma_i$ for all $i \in S$. Now, since the polynomials $p(X)$ and $q(X)$ agree on all $i \in S$, $$p(X)-q(X)=\delta\Pi_{i \in S}(X-i)$$

for some $\delta \in \mathbb{F}_{\ell^\alpha}$. Comparing the coefficients of $X^k$, $p_k - q_k = \delta$, which gives $\delta \notin \mathbb{F}_{\ell^\beta}$. Therefore, $p(0)=q(0)+\delta\Pi_{i \in S}(-i) \notin \mathbb{F}_{\ell^\beta}$, proving that $p(X) \in C_1^{(k)}$.

2. Fix any $p_k \in \mathbb{F}_{\ell^\beta} \setminus \{0\}$ and any $p_0 \notin \mathbb{F}_{\ell^\beta}$. Then there exists a unique polynomial $p(X)=p_k X^k + \ldots + p_0 \in \mathbb{F}_{\ell^\alpha}[X]$ with $p_{k'-1} = \ldots = p_{k+1}=0$ such that $p(i)=\gamma_i$ for all $i \in S$. Since $p(X) \in C_1^{(k')}$, this shows that $(\gamma_i)_{i \in S}$ is admissible for $C_1^{(k')}$. The proofs for $C_2^{(k')}$ and $C_3^{(k')}$ are similar.

Lemma 4 Let $S \subseteq \{1, 2, \ldots, n\}$ be of size $|S|=k$, and let $(\gamma_i)_{i \in S}$ be a sequence of elements of $\mathbb{F}_{\ell^\alpha}$.

1. Suppose $(\gamma_i)_{i \in S}$ is admissible for $C_1^{(k)}$ (respectively $C_2^{(k)}$). If $p(X)$ is randomly and uniformly picked from $C_1^{(k)}$ (respectively $C_2^{(k)}$), then $$Pr[p(i)=\gamma_i \text{ for all } i \in S] = (\ell^{\alpha k} - \ell^{\alpha k - \alpha + \beta})^{-1}.$$

In particular, there are $\ell^{\alpha k} - \ell^{\alpha k - \alpha + \beta}$ admissible sequences for $C_1^{(k)}$ (respectively $C_2^{(k)}$).

2. Suppose $k<k' \leq n$. Then, for $m=1, 2, 3$, if $p(X)$ is randomly and uniformly picked from $C_m^{(k')}$, $$Pr[p(i)=\gamma_i \text{ for all } i \in S] = (\ell^{\alpha k})^{-1}.$$

Proof.

1. Since $(\gamma_i)_{i \in S}$ is admissible for $C_1^{(k)}$, there exists some polynomial $q(X) \in C_1^{(k)}$ such that $q(i)=\gamma_i$ for all $i \in S$.

For each choice of $\gamma \in \mathbb{F}_{\ell^\beta} \setminus \{0\}$, there is exactly one polynomial $q^{(\gamma)}(X)$ of degree $k$ such that its leading coefficient is $\gamma$ and such that $q^{(\gamma)}(i)=\gamma_i$ for all $i \in S$. Now, since the polynomials $q^{(\gamma)}(X)$ and $q(X)$ agree on all $i \in S$, $$q^{(\gamma)}(X)-q(X)=\delta\Pi_{i \in S}(X-i)$$

for some $\delta \in \mathbb{F}_{\ell^\alpha}$. As the coefficients of $X^k$ for both $q(X)$ and $q^{(\gamma)}(X)$ lie in $\mathbb{F}_{\ell^\beta}$, so does $\delta$. Hence, it follows from $q(0) \notin \mathbb{F}_{\ell^\beta}$ that $q^{(\gamma)}(0)=q(0)+\delta\Pi_{i \in S}(-i) \notin \mathbb{F}_{\ell^\beta}$.

In other words, it is shown that, given any choice of $\gamma \in \mathbb{F}_{\ell^\beta} \setminus \{0\}$, there is exactly one polynomial $q^{(\gamma)}(X) \in C_1^{(k)}$ such that $q^{(\gamma)}(i)=\gamma_i$ for all $i \in S$. Since $|C_1^{(k)}|=(\ell-1)(\ell^\alpha)^{k-1}(\ell^\alpha - \ell^\beta) = \ell^{\alpha k - \alpha + \beta}(\ell^{\alpha-\beta}-1)(\ell^\beta-1)$, $$Pr[p(i) = \gamma_i \text{ for all } i \in S]$$
$$= \frac{\ell^\beta - 1}{\ell^{\alpha k - \alpha + \beta}(\ell^{\alpha-\beta}-1)(\ell^\beta - 1)}$$
$$= (\ell^{\alpha k} - \ell^{\alpha k - \alpha + \beta})^{-1},$$

as desired.

The proof for $C_2^{(k)}$ is similar.

2. Fix some set $T \subseteq \{1, 2, \ldots, n\} \setminus S$ of size $k'-k-1$. Choose some $p_k \in \mathbb{F}_{\ell^\beta} \setminus \{0\}$, $p_0 \notin \mathbb{F}_{\ell^\beta}$ and $\gamma_i \in \mathbb{F}_{\ell^\alpha}$ for $i \in T$. Then there exists a unique polynomial $p(X)=p_k X^{k'} + \ldots + p_0 \in \mathbb{F}_{\ell^\alpha}[X]$ such that $p(i)=\gamma_i$ for all $i \in S \cup T$. This shows that $$Pr[p(i) = \gamma_i \text{ for all } i \in S]$$
$$= \frac{\text{number of choices for } p_k, p_0 \text{ and } \gamma_i \text{ for } i \in T}{|C_1^{(k')}|}$$
$$= \frac{(\ell^\beta - 1)(\ell^\alpha - \ell^\beta)(\ell^\alpha)^{k'-k-1}}{\ell^{\alpha k' - \alpha + \beta}(\ell^{\alpha-\beta}-1)(\ell^\beta - 1)} = (\ell^{\alpha k})^{-1}.$$

The proofs for $C_2^{(k)}$ and $C_3^{(k)}$ are similar.

Given this foundation, Theorem 2 can be proved by the following:

Proof of Theorem—Perfect Authorization Verification: Let S be a subset of $\{1, 2, \ldots, n\}$ of size k, and let $q(X) \in \mathbb{F}_{\ell^\alpha}[X]$ be the unique polynomial of degree $\leq k-1$ such that $q(i)=\omega_i^{\lceil k/2 \rceil}$.

If k is even, then by construction, it is immediate that $q(0) \in \mathbb{F}_{\ell^\beta}$ or $q(0) \notin \mathbb{F}_{\ell^\beta}$ depending on whether or not $k \geq t$. If k is odd, this follows from parts (i) to (iii) of Lemma 1.

Perfect Correctness: It is proved that any authorized subset can correctly identify itself as being authorized. Thus, perfect correctness follows from perfect correctness of Shamir's secret sharing scheme.

Perfect Secrecy: Since the choices of $\omega_i^j$ do not depend on the secret $\kappa$, perfect secrecy of our scheme follows essentially from the perfect secrecy property of Shamir's secret sharing scheme.

Perfect Access Structure Hiding: Let $1 \leq t < t' \leq n$. Let $\omega_i^j$ denote the access structure tokens for the case where the access structure is $\Gamma_t$, and $\omega'_i^j$ denote the access structure tokens for the case where the access structure is $\Gamma_{t'}$. Suppose $|S|=k=t-1$. It can be proved that $$\{\omega_i^j\}_{i \in S, 1 \leq j \leq \lceil n/2 \rceil} \text{ and } \{\omega'_i^j\}_{i \in S, 1 \leq j \leq \lceil n/2 \rceil}$$

are identically distributed. Since $\omega_i^{j_1}$ is chosen independently of $\omega_i^{j_2}$ for $j_1 \neq j_2$, this reduces to the claim that, for fixed j, $\{\omega_i^j\}_{i \in S}$ and $\{\omega'_i^j\}_{i \in S}$ are identically distributed.

Case 1: $j<t/2$ or $j \geq (t'+1)/2$.

This is clear as $\omega_i^j$ and $\omega'_i^j$ are constructed in the same way.

Case 2: $j=t/2$.

Note that $\omega_i^j=p(i)$ where $p(X)$ is randomly and uniformly chosen from $C_2^{(2j-1)}$, while $\omega'_i^j=p'(i)$ where $p'(X)$ is a randomly and uniformly picked from $C_1^{(2j-1)}$.

Suppose $(\gamma_i)_{i \in S}$ is admissible for $C_1^{(2j-1)}$, then, by Lemma 3(a), $(\gamma_i)_{i \in S}$ is also admissible for $C_2^{(2j-1)}$. Thus, by Lemma 4(a), $$Pr[p(i)=\gamma_i \text{ for all } i \in S] = (\ell^{\alpha k} - \ell^{\alpha k - \alpha + \beta})^{-1} = Pr[p'(i) = \gamma_i \text{ for all } i \in S],$$

as required.

Case 3: $t/2<j<t'/2$.

In this case, $\omega_i^j=p(i)$ and $\omega'_i^j=p'(i)$, where $p(X)$ and $p'(X)$ are randomly and uniformly chosen from $C_3^{(2j-1)}$ and $C_1^{(2j-1)}$ respectively.

Suppose $(\gamma_i)_{i \in S}$ is a sequence of elements of $\mathbb{F}_{\ell^\alpha}$. Since $|S|=t-1<2j-1$, $(\gamma_i)_{i \in S}$ is admissible for both $C_1^{(2j-1)}$ and $C_3^{(2j-1)}$ by Lemma 3(b). Furthermore, by Lemma 4(b), $$Pr[p(i)=\gamma_i \text{ for all } i \in S]=(\ell^{\alpha k})^{-1}=Pr[p'(i)=\gamma_i \text{ for all } i \in S].$$

Case 4: $j=t'/2$.

The proof of this case is similar to the proof of case 3.

Figure 6:
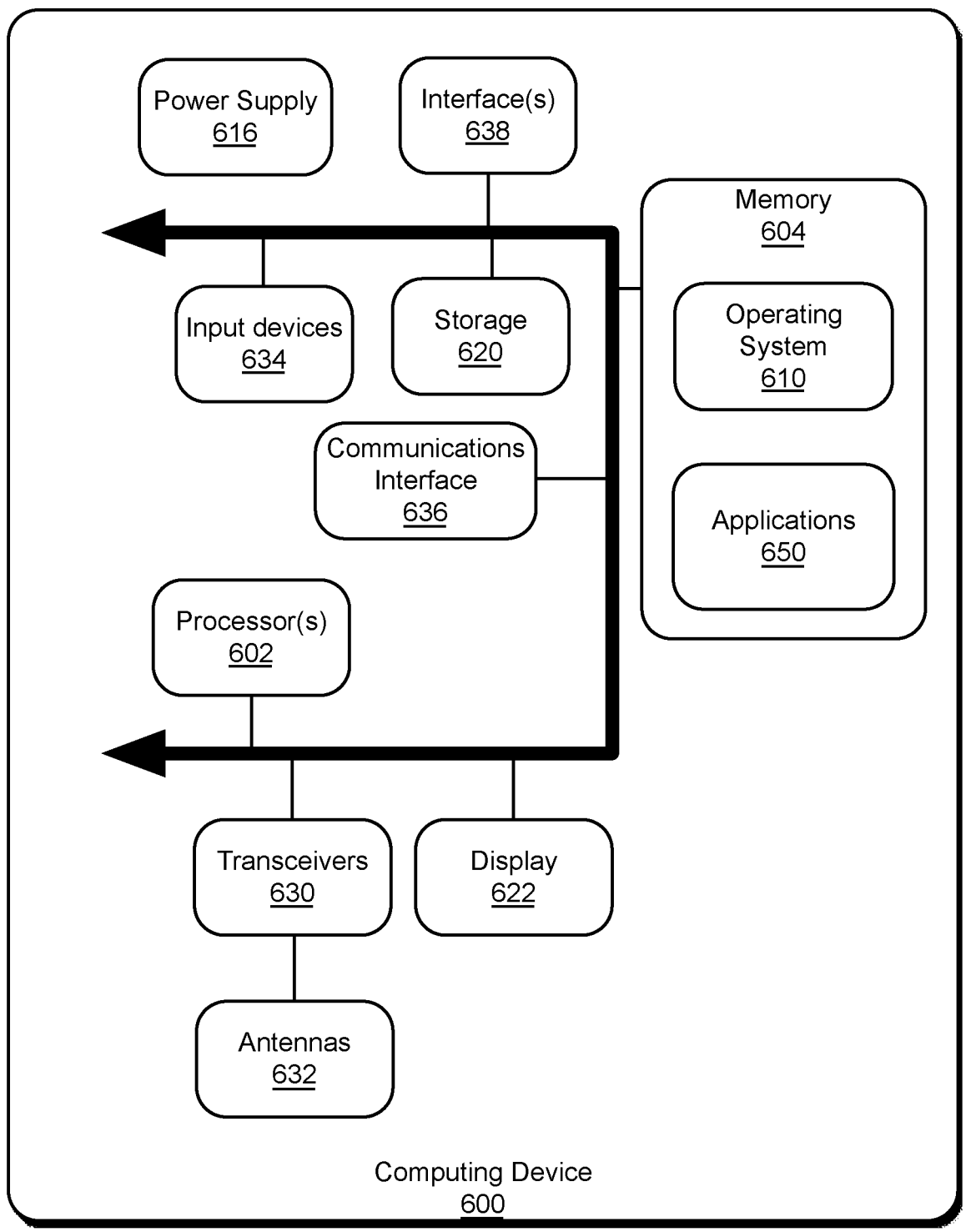
FIG. 6 illustrates an example computing device for implementing the features and operations of the described technology.

FIG. 6 illustrates an example computing device 600 for implementing the features and operations of the described technology. The computing device 600 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more hardware processor(s) 602 and a memory 604. The memory 604 generally includes both volatile memory (e.g., RAM) and nonvolatile memory (e.g., flash memory). An operating system 610 resides in the memory 604 and is executed by the hardware processor(s) 602.

In an example computing device 600, as shown in FIG. 6, one or more modules or segments, such as applications 650, a communications interface, a secret share generator, a token generator, a share distributor, a token processor, an authorization tester, a reconstructor, and other services, workloads, and modules, are loaded into the operating system 610 on the memory 604 and/or storage 620 and executed by hardware processor(s) 602 or other circuitry. The storage 620 may include one or more tangible storage media devices and may store cryptographic security parameters, thresholds, secrets, secret shares, aggregated shares, threshold access structure tokens, and other data and may be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 that may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of computing device. The computing device 600 may use the adapter and any other types of computing devices for establishing connections over a wide-area network (WAN) or local-area network (LAN). It should be appreciated that the network connections shown are exemplary and that other computing devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The computing device 600 may further include a display 622, such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more hardware processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device 802 implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server computing devices.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A computing-processor-implemented method of cryptographically sharing a cryptographic secret among multiple parties, the method comprising:
    generating a share of the cryptographic secret for each party of the multiple parties;
    generating a set of multiple threshold access structure tokens for each party of the multiple parties, the multiple threshold access structure tokens being generated for a party from one or more random token polynomials selected from a finite field based on a number of the multiple parties capable of attempting to reconstruct the cryptographic secret; and
    distributing the shares of the cryptographic secret and the sets of the multiple threshold access structure tokens to the multiple parties, each party receiving a different share of the cryptographic secret and a different set of the multiple threshold access structure tokens, wherein at least a threshold number of the parties can reconstruct the cryptographic secret using the shares of the cryptographic secret and the multiple threshold access structure tokens corresponding to at least a threshold number of the parties attempting to reconstruct the cryptographic secret and less than the threshold number of the parties cannot reconstruct the cryptographic secret using the shares of the cryptographic secret and the multiple threshold access structure tokens corresponding to the less than the threshold number of the parties.

2. The computing-processor-implemented method of claim 1, wherein the operation of generating a share comprises:
    selecting a random share polynomial in a finite field and having a degree less than the threshold number; and
    generating the share for each of the parties using the random share polynomial.

3. The computing-processor-implemented method of claim 1, wherein the generating of the multiple threshold access structure tokens comprises:
    selecting, for an integer less than the threshold number, a random token polynomial of the one or more random token polynomials with a coefficient corresponding to a highest degree of the random token polynomial that is a member of a subfield of the finite field and a constant of the random token polynomial is not a member of the subfield of the finite field; and
    generating one or more of the multiple threshold access structure tokens from coefficients of the selected random token polynomial, the one or more of the multiple threshold access structure tokens indicating that the number of the multiple parties attempting to reconstruct the cryptographic secret is unauthorized to reconstruct the cryptographic secret.

4. The computing-processor-implemented method of claim 3, wherein a number of the parties attempting to reconstruct the cryptographic secret that is less than the threshold number and the cryptographic secret is not reconstructable using the shares and the multiple threshold access structure tokens of the attempting parties corresponding to the number of attempting parties.

5. The computing-processor-implemented method of claim 1, wherein the generating of the multiple threshold access structure tokens comprises:
    selecting, for an integer greater than or equal to the threshold number, a random token polynomial of the one or more random token polynomials with a coefficient corresponding to a highest degree of the random token polynomial that is a member of a subfield of the finite field and a constant of the random token polynomial is also a member of the subfield of the finite field; and
    generating one or more of the multiple threshold access structure tokens from the selected random token polynomial, the one or more of the multiple threshold access structure tokens indicating that the number of the multiple parties attempting to reconstruct the cryptographic secret is authorized to reconstruct the cryptographic secret.

6. The computing-processor-implemented method of claim 3, wherein a number of the parties attempting to reconstruct the cryptographic secret that is greater than or equal to the threshold number and the cryptographic secret is reconstructable using the shares and the multiple threshold access structure tokens of the attempting parties corresponding to the number of attempting parties.

7. The computing-processor-implemented method of claim 1, wherein the generating of the multiple threshold access structure tokens comprises:
    selecting, for an odd integer that is one less than the threshold number, a random token polynomial of the one or more random token polynomials with a coefficient corresponding to a highest degree of the random token polynomial that is not a member of a subfield of the finite field and a constant of the random token polynomial is a member of the subfield of the finite field; and
    generating one or more of the multiple threshold access structure tokens from the selected random token polynomial, the one or more of the multiple threshold access structure tokens indicating that the number of the multiple parties attempting to reconstruct the cryptographic secret is unauthorized to reconstruct the cryptographic secret.

8. A system for cryptographically sharing a cryptographic secret among multiple parties, the system comprising:
   one or more hardware processors;
   a secret share generator executable by the one or more hardware processors and configured to generate a share of the cryptographic secret for each party of the multiple parties;
   a token generator executable by the one or more hardware processors and configured to generate a set of multiple threshold access structure tokens for each party of the multiple parties, the multiple threshold access structure tokens being generated for a party from one or more random token polynomials selected from a finite field based on a number of the multiple parties capable of attempting to reconstruct the cryptographic secret; and
   a share distributor executable by the one or more hardware processors and configured to distribute the shares of the cryptographic secret and the sets of multiple threshold access structure tokens to the multiple parties, each party receiving a different share of the cryptographic secret and a different set of the multiple threshold access structure tokens, wherein at least a threshold number of the parties can reconstruct the cryptographic secret using the shares of the cryptographic secret and the multiple threshold access structure tokens corresponding to at least a threshold number of the parties attempting to reconstruct the cryptographic secret and less than the threshold number of the parties cannot reconstruct the cryptographic secret using the shares of the cryptographic secret and the multiple threshold access structure tokens corresponding to the less than the threshold number of the parties.

9. The system of claim 8, wherein the secret share generator is configured to generate a share by selecting a random share polynomial in a finite field and having a degree less than the threshold number, the random share polynomial being selected to generate the share for each of the parties using the random share polynomial.

10. The system of claim 8, wherein the token generator is configured to generate the multiple threshold access structure tokens by selecting, for an integer less than the threshold number, a random token polynomial of the one or more random token polynomials with a coefficient corresponding to a highest degree of the random token polynomial that is a member of a subfield of the finite field and a constant of the random token polynomial is not a member of the subfield of the finite field, and to generate one or more of the multiple threshold access structure tokens from the selected random token polynomial, the one or more of the multiple threshold access structure tokens indicating that the number of the multiple parties attempting to reconstruct the cryptographic secret is unauthorized to reconstruct the cryptographic secret.

11. The system of claim 10, wherein a number of the parties attempting to reconstruct the cryptographic secret that is less than the threshold number and the cryptographic secret is not reconstructable using the shares and the multiple threshold access structure tokens of the attempting parties corresponding to the number of attempting parties.

12. The system of claim 8, wherein the token generator is configured to generate the multiple threshold access structure tokens by
   selecting, for an integer greater than or equal to the threshold number, a random token polynomial of the one or more random token polynomials with a coefficient corresponding to a highest degree of the random token polynomial that is a member of a subfield of the finite field and a constant of the random token polynomial is also a member of the subfield of the finite field, and
   generating one or more of the multiple threshold access structure tokens from the selected random token polynomial, the one or more of the multiple threshold access structure tokens indicating that the number of the multiple parties attempting to reconstruct the cryptographic secret is authorized to reconstruct the cryptographic secret.

13. The system of claim 12, wherein a number of the parties attempting to reconstruct the cryptographic secret that is greater than or equal to the threshold number and the cryptographic secret is reconstructable using the shares and the multiple threshold access structure tokens of the attempting parties corresponding to the number of attempting parties.

14. The system of claim 8, wherein the token generator is configured to generate the multiple threshold access structure tokens by
   selecting, for an odd integer that is one less than the threshold number, a random token polynomial of the one or more random token polynomials with a coefficient corresponding to a highest degree of the random token polynomial that is not a member of a subfield of the finite field and a constant of the random token polynomial is a member of the subfield of the finite field, and
   generating one or more of the multiple threshold access structure tokens from the selected random token polynomial, the one or more of the multiple threshold access structure tokens indicating that the number of the multiple parties attempting to reconstruct the cryptographic secret is unauthorized to reconstruct the cryptographic secret.

15. One or more tangible processor-readable storage media embodied with instructions for executing on one or more processors and circuits of a computing device a process cryptographically sharing a cryptographic secret among multiple parties, the process comprising:
   generating a share of the cryptographic secret for each party of the multiple parties;
   generating a set of multiple threshold access structure tokens for each party of the multiple parties, the multiple threshold access structure tokens being generated for a party from one or more random token polynomials selected from a finite field based on a number of the multiple parties capable of attempting to reconstruct the cryptographic secret; and
   distributing the shares of the cryptographic secret and the sets of multiple threshold access structure tokens to the multiple parties, each party receiving a different share of the cryptographic secret and a different set of the multiple threshold access structure tokens, wherein at least a threshold number of the parties can reconstruct the cryptographic secret using the shares of the cryptographic secret and the multiple threshold access structure tokens corresponding to at least a threshold number of the parties attempting to reconstruct the cryptographic secret and less than the threshold number of the parties cannot reconstruct the cryptographic secret using the shares of the cryptographic secret and the multiple threshold access structure tokens corresponding to the less than the threshold number of the parties.

16. The one or more tangible processor-readable storage media of claim 15, wherein the generating of the multiple threshold access structure tokens comprises:
- selecting, for an integer less than the threshold number, a random token polynomial of the one or more random token polynomials with a coefficient corresponding to a highest degree of the random token polynomial that is a member of a subfield of the finite field and a constant of the random token polynomial is not a member of the subfield of the finite field; and
- generating one or more of the multiple threshold access structure tokens from the selected random token polynomial, the one or more of the multiple threshold access structure tokens indicating that the number of the multiple parties attempting to reconstruct the cryptographic secret is unauthorized to reconstruct the cryptographic secret.

17. The one or more tangible processor-readable storage media of claim 16, wherein a number of the parties attempting to reconstruct the cryptographic secret that is less than the threshold number and the cryptographic secret is not reconstructable using the shares and the multiple threshold access structure tokens of the attempting parties corresponding to the number of attempting parties.

18. The one or more tangible processor-readable storage media of claim 15, wherein the generating of the multiple threshold access structure tokens comprises:
- selecting, for an integer greater than or equal to the threshold number, a random token polynomial of the one or more random token polynomials with a coefficient corresponding to a highest degree of the random token polynomial that is a member of a subfield of the finite field and a constant of the random token polynomial is also a member of the subfield of the finite field; and
- generating one or more of the multiple threshold access structure tokens from the selected random token polynomial, the one or more of the multiple threshold access structure tokens indicating that the number of the multiple parties attempting to reconstruct the cryptographic secret is authorized to reconstruct the cryptographic secret.

19. The one or more tangible processor-readable storage media of claim 18, wherein a number of the parties attempting to reconstruct the cryptographic secret that is greater than or equal to the threshold number and the cryptographic secret is reconstructable using the shares and the multiple threshold access structure tokens of the attempting parties corresponding to the number of attempting parties.

20. The one or more tangible processor-readable storage media of claim 15, wherein the generating of the multiple threshold access structure tokens comprises:
- selecting, for an odd integer that is one less than the threshold number, a random token polynomial of the one or more random token polynomials with a coefficient corresponding to a highest degree of the random token polynomial that is not a member of a subfield of the finite field and a constant of the random token polynomial is a member of the subfield of the finite field; and
- generating one or more of the multiple threshold access structure tokens from the selected random token polynomial, the one or more of the multiple threshold access structure tokens indicating that the number of the multiple parties attempting to reconstruct the cryptographic secret is unauthorized to reconstruct the cryptographic secret.

* * * * *